(12) United States Patent
Muikaichi et al.

(10) Patent No.: US 8,687,116 B2
(45) Date of Patent: Apr. 1, 2014

(54) VIDEO OUTPUT DEVICE AND VIDEO DISPLAY SYSTEM

(75) Inventors: Masahiro Muikaichi, Osaka (JP); Toyoharu Kuroda, Osaka (JP)

(73) Assignee: Panasonic Corporation, Osaka (JP)

( * ) Notice: Subject to any disclaimer, the term of this patent is extended or adjusted under 35 U.S.C. 154(b) by 265 days.

(21) Appl. No.: 13/147,279

(22) PCT Filed: Dec. 27, 2010

(86) PCT No.: PCT/JP2010/007572
§ 371 (c)(1),
(2), (4) Date: Aug. 1, 2011

(87) PCT Pub. No.: WO2011/086653
PCT Pub. Date: Jul. 21, 2011

(65) Prior Publication Data
US 2011/0285905 A1    Nov. 24, 2011

(30) Foreign Application Priority Data
Jan. 14, 2010   (JP) ................. 2010-005453

(51) Int. Cl.
*H04N 7/08*    (2006.01)
*H04N 7/035*   (2006.01)

(52) U.S. Cl.
USPC ........................................ 348/464; 386/239

(58) Field of Classification Search
USPC ....................................................... 348/464
See application file for complete search history.

(56) References Cited

U.S. PATENT DOCUMENTS

| | | | |
|---|---|---|---|
| 6,377,230 B1 | 4/2002 | Yamazaki et al. | |
| 8,306,387 B2 * | 11/2012 | Yamashita et al. | 386/239 |
| 8,466,954 B2 * | 6/2013 | Ko et al. | 348/56 |
| 2002/0105483 A1 | 8/2002 | Yamazaki et al. | |
| 2007/0279319 A1 | 12/2007 | Yamazaki et al. | |
| 2010/0079585 A1 * | 4/2010 | Nemeth et al. | 348/54 |
| 2012/0169714 A1 * | 7/2012 | Hsu et al. | 345/419 |

FOREIGN PATENT DOCUMENTS

| | | |
|---|---|---|
| JP | 9-101749 | 4/1997 |
| JP | 2003-248195 | 9/2003 |
| JP | 2009-164977 | 7/2009 |

OTHER PUBLICATIONS

International Search Report issued Mar. 29, 2011 in International (PCT) Application No. PCT/JP2010/007572.

* cited by examiner

*Primary Examiner* — Sath V Perungavoor
*Assistant Examiner* — Howard D Brown, Jr.
(74) *Attorney, Agent, or Firm* — Wenderoth, Lind & Ponack, L.L.P.

(57) ABSTRACT

A video output device outputs a plurality of video streams with use of shutter glasses, and dynamically switches between different videos such that in the case where a plurality of viewers are viewing a video output by the video output device, only a viewer who is operating a remote control can view a video stream different from a video stream other viewers are viewing. Operation signals instructing to start or terminate an operation mode are received. In an operation mode, time-sharing output of a first video stream and a second video stream is performed, and synchronizing signals each in synchronization with a time-sharing timing are transmitted. In a normal mode, images that are each generated based on any of images constituting the first video stream are output, and images constituting the second video stream are not output.

7 Claims, 10 Drawing Sheets

VIDEO OUTPUT DEVICE AND VIDEO DISPLAY SYSTEM

BACKGROUND OF INVENTION

1. Technical Field

The present invention relates to a video output device capable of performing time-sharing output of a plurality of video streams.

2. Background Art

With digitization of broadcasting and AV equipments, home AV equipments now have various types of functions.

For example, a display device such as a TV has a function of displaying a menu on a screen for a viewer to operate a remote control to select an item for changing the video and audio settings. Such a display device also increases in screen size owing to the plasma technology, and this enables a plurality of viewers to simultaneously view the screen.

In such a case, a menu screen is temporarily necessary for only a viewer who is operating a remote control, and is a disturbance to other viewers.

As an art for enabling each of a plurality of viewers to view a different screen in the same TV, a display device disclosed in Patent Literature 1 is used for example. According to this display device, dual screen display of two different images is performed by time-sharing on a single screen so as to perform time-sharing display of two different videos. Accordingly, a viewer wearing shutter glasses that open in synchronization with a display timing of one of the videos can view the one video, and a viewer wearing shutter glasses that open in synchronization with a display timing of the other video can view the other video.

The shutter glasses are capable of separately blocking light to left eye and light to right eye, with use of a liquid crystal shutter, a polarizing filter, or the like. The shutter glasses perform opening and closing control on shutters so as to perform stereoscopic video display. The control is performed such that a viewer views left-eye planar videos and right-eye planar videos which are alternately displayed one by one, with his left eye and right eye, respectively.

With the appearance of TVs that realize stereoscopic video viewing, there is an expectancy that TV viewing with shutter glasses becomes popular.

CITATION LIST

Patent Literature

[Patent Literature 1] Japanese Patent Application Publication No. 09-101749

SUMMARY OF INVENTION

By the way, the above conventional display device has been designed based on the assumption that a single display equipment is shared among a plurality of viewers. This causes a problem that a plurality of viewers, who are viewing a video in such a single display equipment, each cannot switch between viewing of the same video and viewing of a different video.

Specifically, in the case where a plurality of viewers are each viewing a different video, a menu screen is displayed on one video while the menu screen is not displayed on the other video. This disturbs no viewer in video viewing the other video. On the contrary, in the case where a plurality of viewers are viewing the same video, when the menu screen is displayed on the video, all of the plurality of viewers must view the menu screen. This disturbs the viewers other than a viewer operating the remote control in viewing the video.

In view of the above problem, the present invention aims to provide a video output device that is capable of, in the case where a necessary video such as a menu screen needs to be temporarily displayed while a plurality of viewers are viewing a certain video, outputting the necessary video without disturbing any of the viewers who do not want to view the necessary video in viewing the certain video.

In order to achieve the above aim, the present invention provides a video output device that performs time-sharing output of a plurality of video streams, the video output device comprising: an operation signal reception unit operable to receive operation signals each instructing to start or terminate a predetermined operation; a video output unit operable, (i) in an operation mode, to alternately output first image sets each composed of two or more of first images constituting a first video stream and second image sets each composed of two or more of second images constituting a second video stream, the operation mode starting with reception of an operation signal instructing to start the predetermined operation and ending with reception of an operation signal instructing to terminate the predetermined operation, and (ii) in a normal mode that is other than the operation mode, to output images each generated based on any of the first images, without outputting the second images; and a synchronizing signal transmission unit operable, in the operation mode, to transmit a synchronizing signal indicating a timing of switching output intervals between the first image sets and the second image sets.

Also, the present invention provides a video display system that includes a video display device that performs time-sharing display of a plurality of video streams and shutter glasses for use in viewing a video displayed by the video display device, the video display device comprising: an operation signal reception unit operable to receive operation signals each instructing to start or terminate a predetermined operation; a video output unit operable, (i) in an operation mode, to alternately output first image sets each composed of two or more of first images constituting a first video stream and second image sets each composed of two or more of second images constituting a second video stream, the operation mode starting with reception of an operation signal instructing to start the predetermined operation and ending with reception of an operation signal instructing to terminate the predetermined operation, and (ii) in a normal mode that is other than the operation mode, to output images each generated based on any of the first images, without outputting the second images; and a synchronizing signal transmission unit operable, in the operation mode, to transmit a synchronizing signal indicating a timing of switching output intervals between the first image sets and the second image sets; and a video display unit operable to display the video output by the video output unit, and the shutter glasses comprising: a selection unit operable to select viewing of the first video stream or viewing of the second video stream in the operation mode; a synchronizing signal reception unit operable to receive the synchronizing signal; and a shutter control unit operable to perform shutter control in the operation mode based on the synchronizing signal, such that (i) when viewing of the first video stream is selected, shutters are opened in an output interval of the first image set and the shutters are closed in an output interval of the second image set, and (ii) when viewing of the second video stream is selected, the shutters are closed in the output interval of the first image set and the shutters are opened in the output interval of the second image set.

According to the above video output device, the first video stream is output in the normal mode, and time-sharing output of the first video stream and the second video stream is performed in the operation mode. Also, a synchronizing signal is transmitted indicating a timing of switching output intervals between the first video stream and the second video stream. Accordingly, by viewing a video output by the video output device with shutter glasses that open and close shutters based on the synchronizing signal, it is possible to select viewing of the first video stream or viewing of the second video stream in the operation mode.

Assume that the first video stream is a normal screen where no menu is displayed, the second video stream is a menu screen, and a plurality of viewers are viewing a TV screen on which the first video stream is displayed. In this case, one of the viewers operates a remote control to call the menu screen so as to view the second video stream. This causes only the viewer who is operating the remote control to view the menu screen and cause other viewers to continue to view the normal screen free from disturbance by the menu screen.

Also, according to the above video display system, by viewing a video output from the video output device with shutter glasses that open and close a shutter based on the synchronizing signal, it is possible to select viewing of the first video and viewing of the second video in the operation mode.

Here, the second images each may be generated by overlaying, on one of the first images that is output immediately before the second image is to be output, an image that is not included in the first images.

The second images are each generated by overlaying, on one of the first images, a screen such as a menu screen. As a result, a viewer who is operating the remote control can also viewing the menu screen or the like against a background of the first video stream.

Here, the images output in the normal mode may include complementary images that are each generated based on any of the first images, and at a time when each of the complementary images is output in the normal mode, a different one of the second images may be output in the operation mode.

At a time when each of the second images is output in the operation mode, a different one of complementary images that are each generated based on any of the first images is output in the normal mode. The shutters of the shutter glasses open in the normal mode at a time when each of the first images is output. Also, the shutters of the shutter glasses open in the normal mode at a time when the complementary image is output in the normal mode. As a result, the viewer can view the first video stream whose fluidity is increased more in the normal mode.

Here, at a time when each of the second images is output in the operation mode, a different predetermined one of the first images may be output in the normal mode.

When it is difficult to ensure a timing of outputting each of the second images in the operation mode because of a high frame rate of the first video stream for example, part of the second images is not output. At a time when each of the part of the first images would have been output, a different one of the second images is output. This enables time-sharing output of the first video stream and the second video stream. The first images are partially output by outputting successive images every other piece, for example. This deteriorates the video fluidity. However, time-sharing display allows a viewer who wants to view the first video stream to view the whole first video stream free from disturbance by temporary display of the menu screen that is the second video stream.

Here, the second images each may be generated by overlaying, on an image that is other than one of the first images that is output immediately before the second image is to be output, the output first image whose size is reduced.

The second images are each generated by overlaying, on a portion of the menu screen or the like, one of the first images whose size is reduced. This enables a viewer who needs to view the second video stream to perform operations while viewing the first video stream.

Here, the shutter glasses may include a detection unit operable to detect whether a viewer wearing the shutter glasses is holding an operation device for instructing to start and terminate the predetermined operation, and when the detection unit detects that the viewer is holding the operation device, the selection unit may select viewing of the second video stream, and when the detection unit detects that the viewer is not holding the operation device, the selection unit may select viewing of the first video stream.

In the case where a viewer wearing the shutter glasses is holding the operation device for instructing to start and terminate the predetermined operation, the selection unit is controlled to select viewing of the second video stream. This can save a viewer who needs to operate the remote control the trouble of manually selecting viewing of the first video stream or viewing of the second video stream. It is possible to judge whether the viewer is holding the operation device via a human body communication between the operation device and the shutter glasses, for example.

DETAILED DESCRIPTION OF INVENTION

Embodiment

The following describes a video output device relating to an embodiment of the present invention. According to this video output device, in the case where two viewers X and Y each wearing shutter glasses are viewing a screen of a TV on which a stereoscopic video is displayed, when the viewer X operates a remote control so as to call a menu screen on which selection items for changing the video and audio settings are displayed, only the viewer X can view the menu screen and the viewer Y can continuously view the normal screen that is the same as before the menu screen is displayed. Here, the shutter glasses are controlled so as to alternately display left-eye images and right-eye images one by one, and cause a viewer to view the left-eye images and the right-eye images with his left eye and right eye, respectively. Via such shutter glasses, the viewer can view a video as a stereoscopic video. Such a stereoscopic video is displayed by alternately displaying by time-sharing a video stream composed of successive left-eye images and a video stream composed of successive right-eye images.

Figure 1:
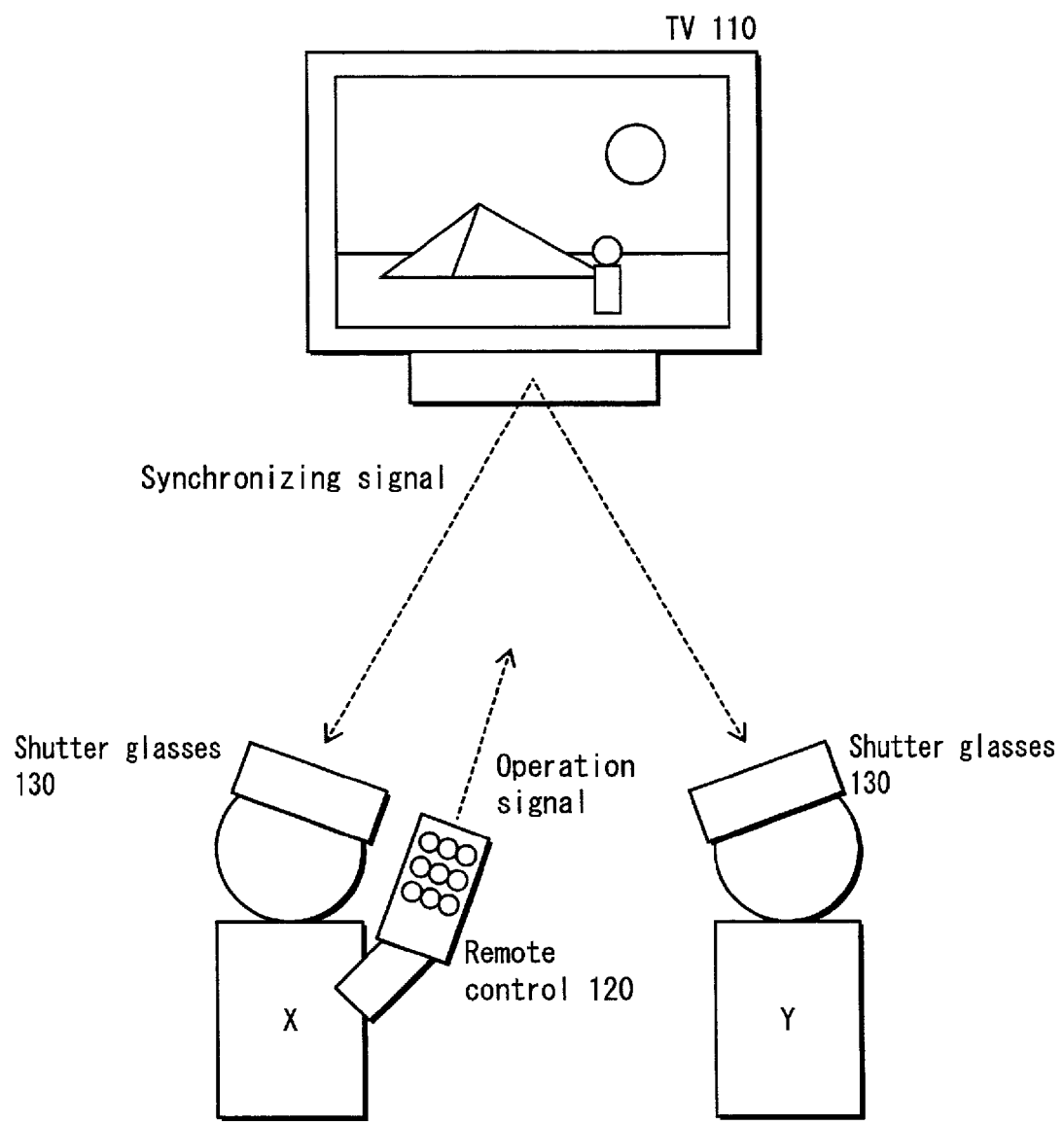
FIG. 1 shows a use form of a video output device relating to an embodiment of the present invention.

FIG. 1 shows a situation where two viewers X and Y each wearing shutter glasses 130 are viewing a TV 110 that includes a video output device 100 relating to the present embodiment. The shutter glasses 130 include a switch which is OFF in the default setting, as described later. When the viewer X operates a remote control 120 to transmit an operation signal to the TV 110, the TV 110 starts time-sharing display of a normal screen, which has been displayed till then, and a menu screen. Here, the video output device 100 transmits a synchronizing signal indicating a timing of switching between output of the normal screen and output of the menu screen. The shutter glasses 130 control opening and closing of shutters based on the synchronizing signal. The viewers can select viewing of the normal screen or viewing of the menu screen, using the switch of the shutter glasses 130. The viewer X, who is operating the remote control 120, turns the switch ON, and as a result can view the menu screen. The viewer Y, who is not operating the remote control 120, remains the switch OFF, and as a result can continuously view only the normal screen without viewing the menu screen.

A display mode where time-sharing display of the normal screen and the menu screen is performed in this way is referred to as "operation mode". A display mode, which is not the operation mode, where the same normal screen is displayed toward all of the viewers, is referred to as "normal mode". Upon receiving an operation signal instructing to start or terminate an operation which needs display of the menu screen via the remote control 120, the video output device 100 switches between the normal mode and the operation mode to perform video output control in accordance with the switching.

Figure 2A:
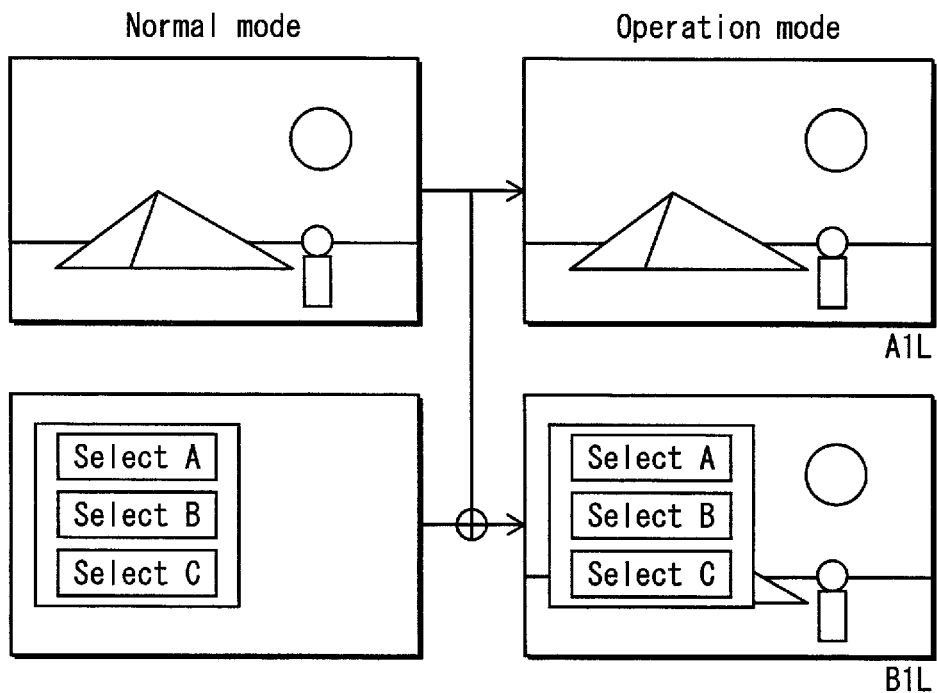
FIG. 2A and FIG. 2B each show an example of a normal screen on which a menu screen is overlaid in the video output device relating to the embodiment.
Figure 2B:
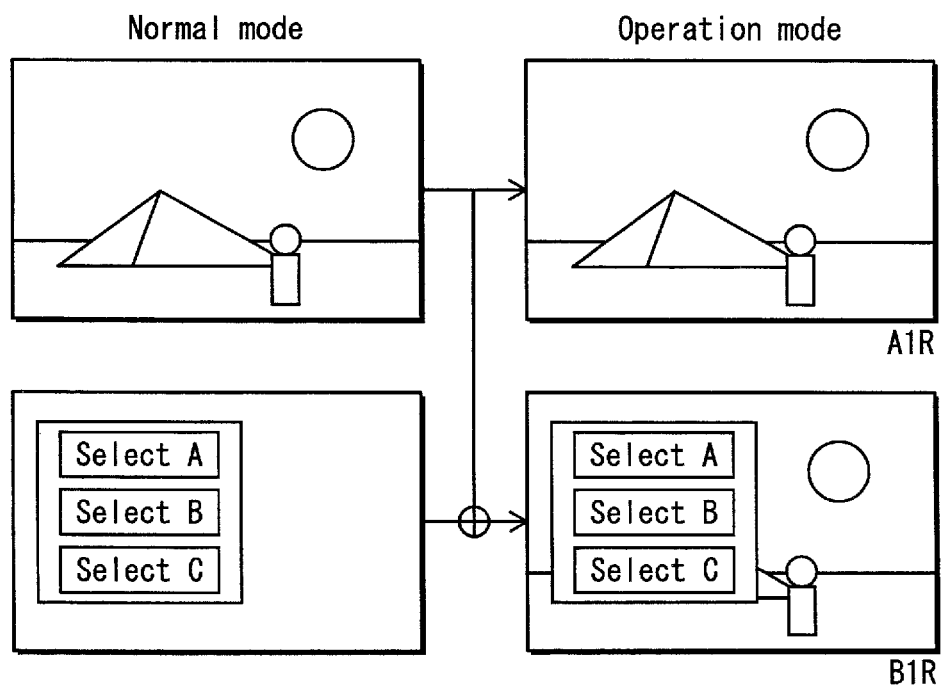

Next, FIG. 2A and FIG. 2B each show an example of a screen in the normal mode and a screen in the operation mode. FIG. 2A shows left-eye images, and FIG. 2B shows right-eye images.

At the upper left in FIG. 2A, a video displayed in the normal mode is shown. At the lower left in FIG. 2A, a graphics for displaying the menu screen is shown. In the operation mode, unless a viewer who is not operating the remote control 102 purposely turns the switch ON, the viewer can continuously view a video that is the same as a video displayed on the normal mode, as shown at the upper right in FIG. 2A. When a viewer who is operating the remote control turns the switch ON, the viewer can view a video that is composed of a video displayed in the normal mode on which a graphics to be displayed as a menu is overlaid, as shown at the lower right in FIG. 2A. Hereinafter, the "menu screen" means a screen that is a video composed of a normal video on which a graphics to be displayed as a menu is overlaid.

The same applies to FIG. 2B.

<Structure>

Figure 3:
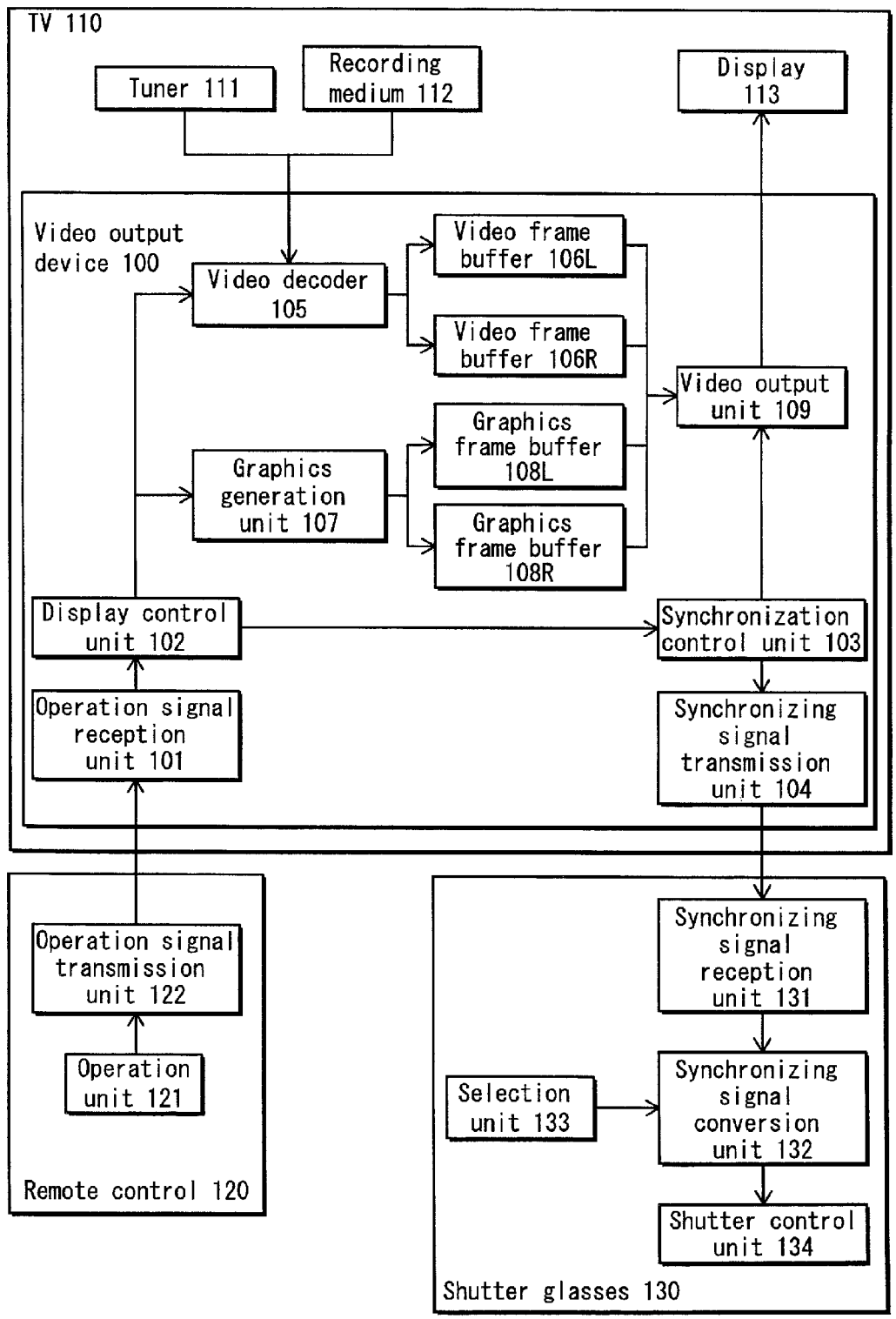
FIG. 3 shows the structure of the video output device relating to the embodiment.

The following describes the structure of a video output system that includes the video output device relating to the present embodiment, with reference to FIG. 3.

The video output device 100 reads a left-eye video and a right-eye video, which are received from the tuner 111 or recorded in the recording medium 112, and judges whether the current display mode is the normal mode or the operation mode based on an operation signal transmitted via the remote control 120. In the normal mode, the video output device 100 outputs, to the display 113, a normal screen by alternately outputting images constituting the left-eye video and images constituting the right-eye video one by one, and transmits a synchronizing signal in synchronization with the output video. In the operation mode, the video output device 100 outputs, to the display 113, a menu screen by alternately outputting left-eye graphics and right-eye graphics one by one, in addition to the normal screen by alternately outputting images constituting the left-eye video and images constituting the right-eye video one by one. The video output device 100 transmits a synchronizing signal in synchronization with the output video.

Here, the synchronizing signal in the normal mode indicates a timing of switching between output of a left-eye image and output of a right-eye image. Also, the synchronizing signal in the operation mode indicates a timing of switching between the normal screen and the menu screen, in addition to a timing of switching between output of a left-eye image and output of a right-eye image.

With the shutter glasses 130 that control opening and closing of the shutters based on the synchronizing signal, the viewer can view a video displayed on the display 113 as a stereoscopic video. In the case where the normal mode is switched to the operation mode, the viewer can view the menu screen by purposely turning the switch ON. Unless the viewer purposely turns the switch ON, the viewer can view the normal screen free from disturbance by the menu screen.

The following describes the structure of the video output device 100. The video output device 100 includes an operation signal reception unit 101, a display control unit 102, a synchronization control unit 103, a synchronizing signal transmission unit 104, a video decoder 105, a video frame buffer 106, a graphics generation unit 107, and a graphics frame buffer 108.

The operation signal reception unit 101 has a function of receiving operation signals each instructing to start or terminate the operation mode, which are transmitted by the remote control 120. Upon receiving an operation signal, the operation signal reception unit 101 notifies the display control unit 102 of the reception of the operation signal.

The display control unit 102 has a function of instructing the video decoder 105 to decode a video that is input by the tuner 111 or the recording medium 112. Also, the display control unit 102 has a function of judging whether the current display mode is the normal mode or the operation mode based on the notification transmitted by the operation signal reception unit 101. When judging that the current display mode is the operation mode, the display control unit 102 instructs the graphics generation unit 107 to generate a menu screen. Furthermore, the display control unit 102 has a function of, when switching occurs between the normal mode and the operation mode, notifying the synchronization control unit 103 of whether the current display mode after the switching is the normal mode or the operation mode.

The synchronization control unit 103 has a function of generating a synchronizing signal based on the notification transmitted by the display control unit 102. When the current display mode notified from the display control unit 102 is the normal mode, the synchronization control unit 103 generates a synchronizing signal indicating a timing of controlling the shutter glasses 130, in order to perform stereoscopic display of a normal screen that is the video decoded by the video decoder 105. When the current display mode notified from the display control unit 102 is the operation mode, the synchronization control unit 103 generates a synchronizing signal indicating a timing of controlling the shutter glasses 130, in order to select a normal screen that is the video decoded by the video decoder 105 or a menu screen that is a video composed of the decoded video on which a video generated by the graphics generation unit 107 is overlaid, and perform stereoscopic display of the selected screen.

Figure 4:
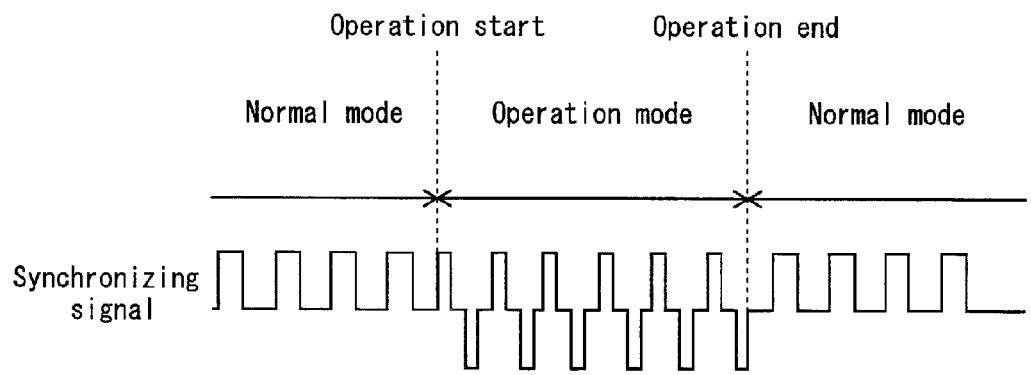
FIG. 4 shows switching of a display mode of the video output device relating to the embodiment.

FIG. 4 shows the relationship between synchronizing signals and timings of switching between the normal mode and the operation mode.

When the operation signal reception unit 101 receives an operation signal instructing to start the operation mode, the display control unit 102 instructs the synchronization control unit 103 to convert to a synchronizing signal for the operation mode, and the synchronizing signal transmission unit 104 transmits the converted synchronizing signal.

When the operation signal reception unit 101 receives an operation signal instructing to terminate the operation mode, the display control unit 102 instructs the synchronization control unit 103 to restore the synchronizing signal that has been converted for the operation mode, and the synchronizing signal transmission unit 104 transmits the restored synchronizing signal.

Figure 5:
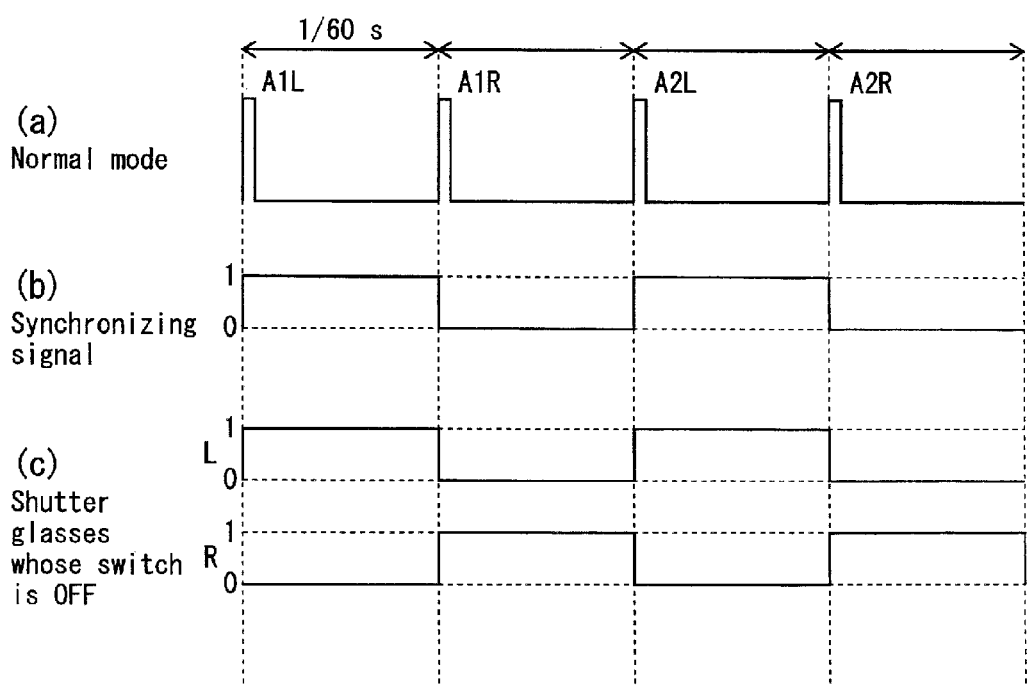
FIG. 5 shows shutter control performed by shutter glasses in a normal mode relating to the embodiment.

FIG. 5 shows the relationship between timings of outputting videos and timings of opening and closing shutters that synchronize with each other based on synchronizing signals.

FIG. 5(a) shows signals each indicating a timing of outputting successive left-eye images A1L and A2L and successive right-eye images A1R and A2R constituting a video to be output in the normal mode. Here, an image "AnL" denotes the n-th image constituting a left-eye video stream that is a normal screen A, where the value "n" is an integer. Also, an image "AnR" denotes the n-th image constituting a right-eye video stream that is the normal screen A.

In FIG. 5(a), a pulse relating to each of the images A1L, A1R, A2L, and A2R is a signal indicating output of the image to the display 113. Here, the right-eye images and the left-eye images constituting a stereoscopic video each have a frame rate of 30 fps. Accordingly, the stereoscopic video has a total frame rate of 60 fps. Signals for outputting the right-eye images and signals for outputting the left-eye image are output alternately one by one every 1/60 s.

As shown in FIG. 5(a), the pulses for outputting respective image are each narrow enough compared to the frame interval of 1/60 s. The image is displayed on the display 113 only at a moment corresponding to an interval corresponding to the pulse, and nothing is displayed on the display 113 at an interval corresponding to no pulse. However, successive output of the images at the frame interval of as high as 1/60 s makes viewer's eyes to recognize the output images as a video.

Only one pulse for outputting each image is shown in FIG. 5(a). However, according to actual plasma TVs, three pulses are output for outputting images of respective three colors of red, green, and blue, thereby to form one image. Furthermore, a combination of the three pulses is output several times to adjust the brightness. Anyway, the whole interval of outputting pulses necessary for outputting one image is designed so as to be shorter than 1/120 s which is half the frame interval of 1/60 s. In other words, in FIG. 5(a), between output of a left-eye image and output of a right-eye image, there remains an interval of at least 1/120 s during which nothing is output.

FIG. 5(b) shows a synchronizing signal indicating a timing for the shutter glasses 130 to perform shutter control for realizing viewing of a stereoscopic video displayed in the normal mode. The synchronizing signal is a pulse that rises at a timing of outputting a left-eye image, and falls at a timing of outputting a right-eye image. Here, the synchronizing signal has the maximum pulse height of 1.

The synchronizing signal transmission unit 104 of the video output device 100 transmits an electromagnetic wave indicated by the above synchronizing signal such as a modulated infrared ray. The synchronizing signal reception unit 131 of the remote control 120 receives the electromagnetic wave and detects the electromagnetic wave to extract the synchronizing signal.

FIG. 5(c) shows the opening and closing status of the shutters controlled in synchronization with the synchronizing signal shown in FIG. 5(b). In FIG. 5(c), a value of 1 indicates an interval where the shutter is opened, and a value of 0 indicates an interval where the shutter is closed. Only when the synchronizing signal has a value of 1, the left-eye shutter is opened. This makes the viewer's left eye to view only a left-eye image. Also, only when the synchronizing signal has a value of 0, the right-eye shutter is opened. This makes the viewer's right eye to view only a right-eye image. As a result, the viewer can view a video with the shutters as a stereoscopic video.

Figure 6:
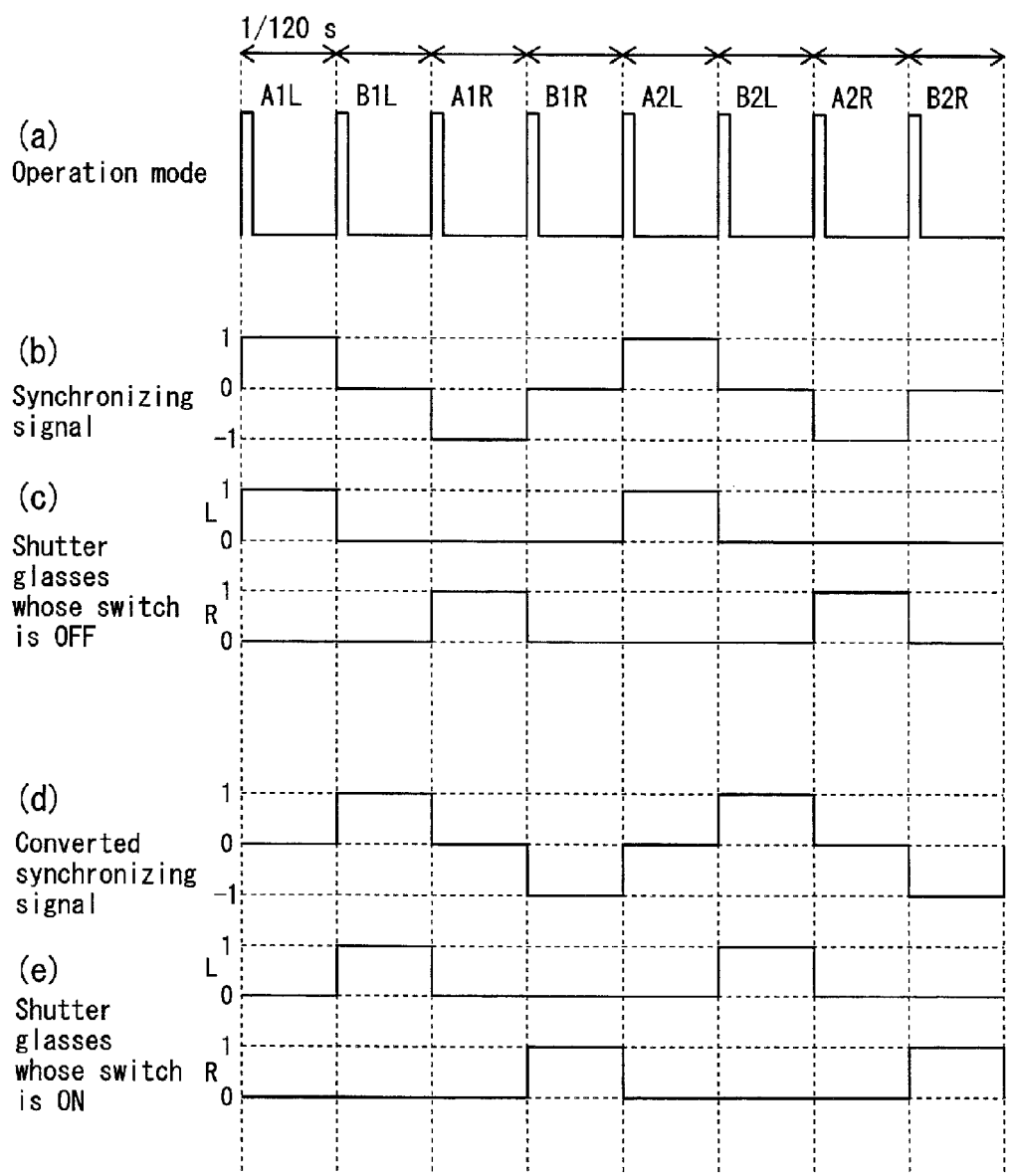
FIG. 6 shows shutter control performed by the shutter glasses in an operation mode relating to the embodiment.

Compared with this, FIG. 6(a) shows signals indicating output of successive left-eye images A1L and A2L and successive right-eye images A1R and A2R constituting a video that is a normal screen to be output in the operation mode, and a signal indicating output of successive left-eye images B1L and B2L and successive right-eye images B1R and B2R constituting a video that is a menu screen to be output in the operation mode. Here, an image "BnL" denotes the n-th image constituting a left-eye video stream that is a menu screen B, where the value "n" is an integer. Also, an image "BnR" denotes the n-th image constituting a right-eye video stream that is the normal screen B. The menu screen B is a screen that is composed of a normal video on which a graphics to be displayed as a menu is overlaid, as described above.

The video output device outputs an image for the menu screen in the operation mode at a time when no signal is output in the normal mode. Accordingly, the frame rate in the operation mode is twice as high as the frame rate in the normal mode.

FIG. 6(b) shows synchronizing signals indicating timings of outputting the images shown in FIG. 6(a). The synchronizing signals are each composed by superimposing a positive pulse signal that rises at a timing of outputting a left-eye normal screen and falls at a timing of outputting a left-eye menu screen and a negative pulse signal that rises at a timing of outputting a right-eye normal screen and falls at a timing of outputting a right-eye menu screen.

FIG. 6(c) shows the opening and closing status of the shutter glasses that control opening and closing of the shutters in synchronization with the synchronizing signal shown in FIG. 6(b) in the case where the selection unit 133 selects viewing of the normal screen. Only when the synchronizing signal has a value of 1, the left-eye shutter is opened. This causes the viewer to view only a left-eye image with the left eye. Also, only when the synchronizing signal has a value of −1, the right-eye shutter is opened. This causes the viewer to view only a right-eye image with the right eye. As a result, the viewer can view a video via the shutter glasses whose switch is OFF, as a stereoscopic video of the normal screen.

On the other hand, in the case where the selection unit 133 selects viewing of the menu screen, the synchronizing signal conversion unit 132 converts the received synchronizing signal as shown in FIG. 6(d). In other words, the synchronizing signal after conversion shown in FIG. 6(d) is equivalent to the synchronizing signal before conversion shown in FIG. 6(b) whose phase is delayed by 1/120 s, which corresponds to one frame.

FIG. 6(e) shows the opening and closing status of the shutter glasses that control opening and closing of the shutters in synchronization with the synchronizing signal after conversion shown in FIG. 6(d). With the shutter glasses, the viewer can view a stereoscopic video that is composed of a normal video on which a graphics to be displayed as a menu is overlaid.

The synchronizing signal transmission unit 104 has a function of transmitting a synchronizing signal generated by the synchronization control unit 103, via a wireless communication such as an infrared communication.

The video decoder 105 has a function of reading a video that is received by the tuner 111 or recorded in the recording medium 112, and decoding the read video. The video decoder 105 also has a function of writing an image resulting from decoding of a video, into the video frame buffer 106. When the decoded video stream is a left-eye video stream, the video decoder 105 writes left-eye images constituting the left-eye video stream into a video frame buffer 106L. When the decoded video stream is a right-eye video stream, the video decoder 105 writes right-eye images constituting the right-eye video stream into a video frame buffer 106R.

The video frame buffer 106 is a memory for storing images decoded by the video decoder 105. The video frame buffer 106 has a buffer for storing left-eye images and a buffer for storing right-eye images.

The graphics generation unit 107 has a function of generating a menu screen to be displayed in the operation mode. Upon receiving a notification of switching to the operation mode from the display control unit 102, the graphics generation unit 107 generates an image of a predetermined top menu, and writes the generated image into the graphics frame buffer 108. Furthermore, upon receiving a notification of reception of an operation signal indicating press of a cursor key or a determination key of the remote control 120 from the display control unit 102, the graphics generation unit 107 generates an image of the menu having the selection items whose states are changed or an image of a submenu based on the operation signal. Since the menu screen is also stereoscopic in the present embodiment, the above image generation is performed separately for left-eye images and right-eye images. The generated left-eye and right-eye images are written into the graphics frame buffers 108L and 108R, respectively.

The graphics frame buffer 108 is a memory for storing an image of the images constituting the menu screen generated by the graphics generation unit 107. The graphics frame buffer 108 has a buffer for storing left-eye images and a buffer for storing right-eye images.

<Video Output Operations>

Figure 7:
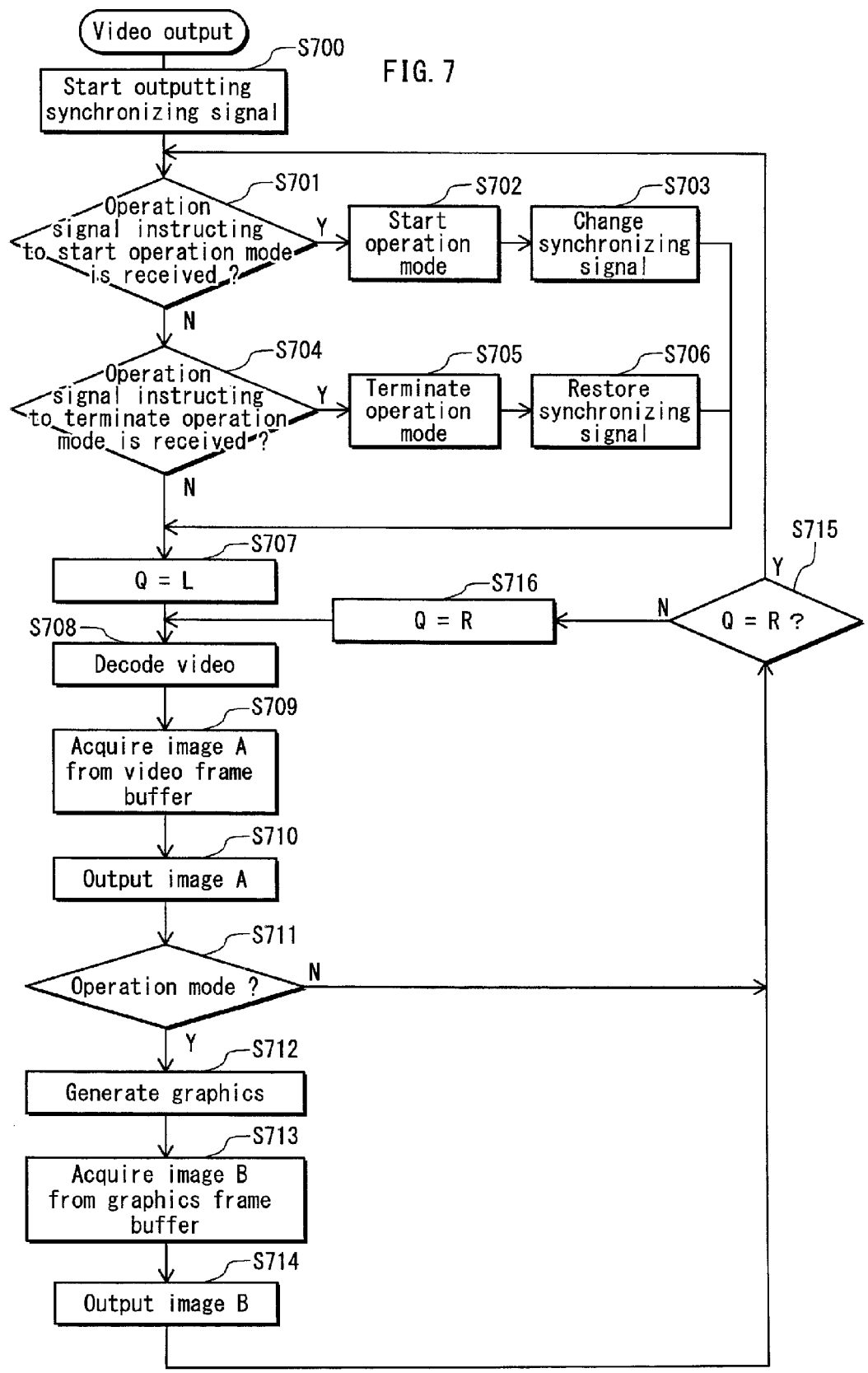
FIG. 7 is a flowchart of video output operations performed by the video output device relating to the embodiment.

The following describes the operations of the video output device 100, with reference to the flowchart shown in FIG. 7.

Firstly, the operation signal reception unit 101 of the video output device 100 receives an operation signal instructing to start outputting a video, from the operation signal transmission unit 122 of the remote control 120. Then, the display control unit 102 instructs the synchronization control unit 103 to generate a synchronizing signal that is to be transmitted in the normal mode. The synchronizing signal transmission unit 104 starts transmitting the generated synchronizing signal (Step S700).

Next, judgment is made as to whether the operation signal reception unit 101 has received an operation signal instructing to start the operation mode (Step S701). When the operation signal reception unit 101 has received the operation signal instructing to start the operation mode (Step S701: Y), the synchronization control unit 103 starts the operation mode (Step S702). Furthermore, the synchronization control unit 103 converts a synchronizing signal which is to be output by the synchronizing signal transmission unit 104 from for the normal mode to for the operation mode (Step S703). As a result, the synchronizing signal generated by the synchronization control unit 103 is as shown in FIG. 6B.

When the operation signal reception unit 101 has not received the operation signal instructing to start the operation mode (Step S701: N), further judgment is made as to whether the operation signal reception unit 101 has received an operation signal instructing to terminate the operation mode (Step S704). When the operation signal reception unit 101 has received the operation signal instructing to terminate the operation mode (Step S704: Y), the synchronization control unit 103 terminates the operation mode (Step S705). Furthermore, the synchronization control unit 103 restores the synchronizing signal that is to be output by the synchronizing signal transmission unit 104 from for the operation mode to for the normal mode (Step S706). As a result, the synchronizing signal generated by the synchronization control unit 103 is as shown in FIG. 5B.

Then, the following processing is performed when Q=L or Q=R (Steps S707, S715, and S716). In these Steps, the value "Q" is a variable indicating whether a video in process is a left-eye video or a right-eye video.

Firstly, video decoding is performed (Step S708). Specifically, the video decoder 105 reads a video that is received from the tuner 111 or recorded in the recording medium 112, and writes an image A resulting from decoding into the video frame buffer 106. Here, when Q=L, a left-eye video is decoded, and when Q=R, a right-eye video is decoded.

Next, the video output unit 109 acquires the image A constituting the normal screen from the video frame buffer 106 (Step S709), and outputs the image A to the display 113 in synchronization with the synchronizing signal (Step S710). Specifically, when Q=L in the normal mode, the video output unit 109 acquires a left-eye image A from the video frame buffer 106 at a timing of pulse rising of the synchronizing signal shown in FIG. 5B, and outputs a pulse signal for displaying the left-eye image A to the display 113. Also, when Q=R in the normal mode, the video output unit 109 acquires a right-eye image A from the video frame buffer 106 at a timing of pulse falling of the synchronizing signal shown in FIG. 5B, and outputs a pulse signal for displaying the right-eye image A to the display 113. When Q=L in the operation mode, the video output unit 109 acquires a left-eye image A from the video frame buffer 106 at a timing of pulse rising from 0 to 1 of the synchronizing signal shown in FIG. 6B, and outputs a pulse signal for displaying the left-eye image A to the display 113. When Q=R in the operation mode, the video output unit 109 acquires a right-eye image A from the video frame buffer 106 at a timing of pulse falling from 0 to −1, and outputs a pulse signal for displaying the right-eye image A to the display 113.

Next, judgment is made as to whether the current display mode is the operation mode (Step S711). When the current display mode is the normal mode (Step S711: N), the above processing is repeatedly performed at intervals of the synchronizing signal of 1/30 s (Step S715: Y).

When the current display mode is the operation mode (Step S711: Y), the graphics generation unit 107 generates graphics representing the menu screen, and overlays the graphics on a normal video to generate an image B, and writes the image B into the graphics frame buffer 108 (Step S712). Specifically, when Q=L, the graphics generation unit 107 generates a left-eye graphics. When Q=R, the graphics generation unit 107 generates a right-eye graphics.

Next, the video output unit 109 acquires the image B from the graphics frame buffer 108, (Step S713), and outputs the acquired image B to the display 113 (Step S714). Specifically, the synchronizing signal shown in FIG. 6B has been transmitted in the operation mode. Accordingly, when Q=L, the video output unit 109 acquires the left-eye image B from the graphics frame buffer 108, at a timing of pulse falling from 1 to 0, and outputs a pulse signal for displaying the left-eye image B to the display 113. Also, when Q=R, the video output unit 109 acquires the right-eye image B from the graphics frame buffer 108, at a timing of pulse rising from −1 to 0, and outputs a pulse signal for displaying the right-eye image B to the display 113.

In the operation mode, the above processing is repeatedly performed at intervals of the synchronizing signal of 1/30 s (Step S715: Y).

<Shutter Control Operations>

Figure 8:
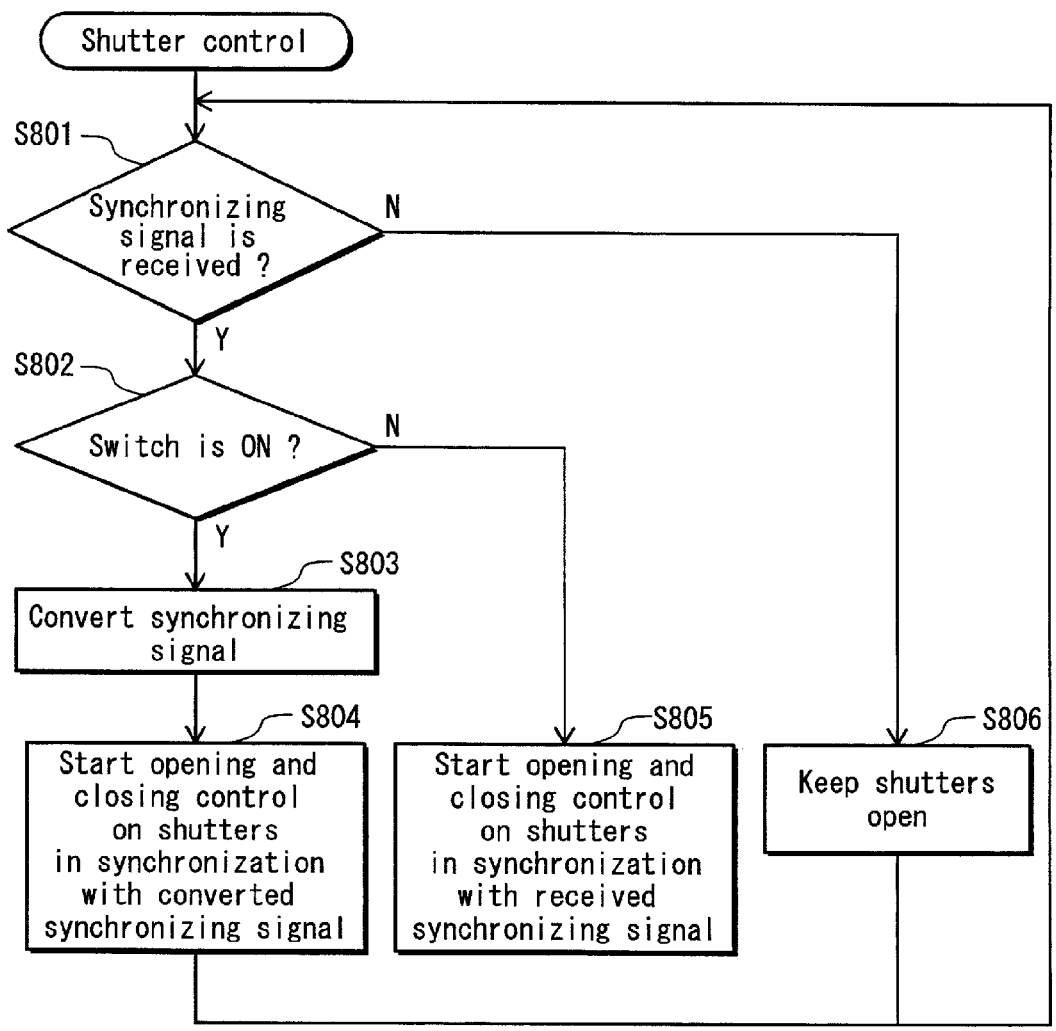
FIG. 8 is a flowchart of opening and closing shutter control performed by the shutter glasses relating to the embodiment.

The following describes the operations of the shutter glasses 130, with reference to a flowchart shown in FIG. 8.

Firstly, it waits for the synchronizing signal reception unit 131 to receive a synchronizing signal (Step S801).

When the synchronizing signal reception unit 131 receives a synchronizing signal (Step S801: Y), judgment is made as to whether the switch of the selection unit 133 is ON or OFF (Step S802).

When the switch is ON (Step S802: Y), the synchronizing signal conversion unit 132 converts the synchronizing signal received by the synchronizing signal reception unit 131 (Step S803). The shutter control unit 134 starts opening and closing control on the shutters in synchronization with the converted synchronizing signal (Step S804).

When the switch is OFF (Step S802: N), the shutter control unit 134 starts opening and closing control on the shutters in synchronization with the synchronizing signal received by the synchronizing signal reception unit 131 (Step S805).

When the synchronizing signal reception unit 131 receives no synchronizing signal (Step S801: N), the shutter control unit 134 terminates opening and closing control on the shutters, and keeps the shutters open (Step S806).

<Supplementary Descriptions>

The above embodiment may be modified as follows.

(1) In the above embodiment, a stereoscopic video is realized by a normal screen and a menu screen, which are each displayed by alternately outputting left-eye images and right-eye images one by one. However, the present invention is not limited to this.

Alternatively, even in the case where both a normal screen and a menu screen are each a planar video, it is possible to cause only a specific viewer to view the menu screen as long as all viewers are each wearing the shutter glasses 130. In this case, since all the viewers view the same planar video in the normal mode, it is only necessary to keep the shutters of the shutter glasses 130 of all the viewers open, without transmitting a synchronizing signal. Furthermore, the same applies to the case where the normal screen is a stereoscopic video and the menu screen is a planar video.

Figure 9:
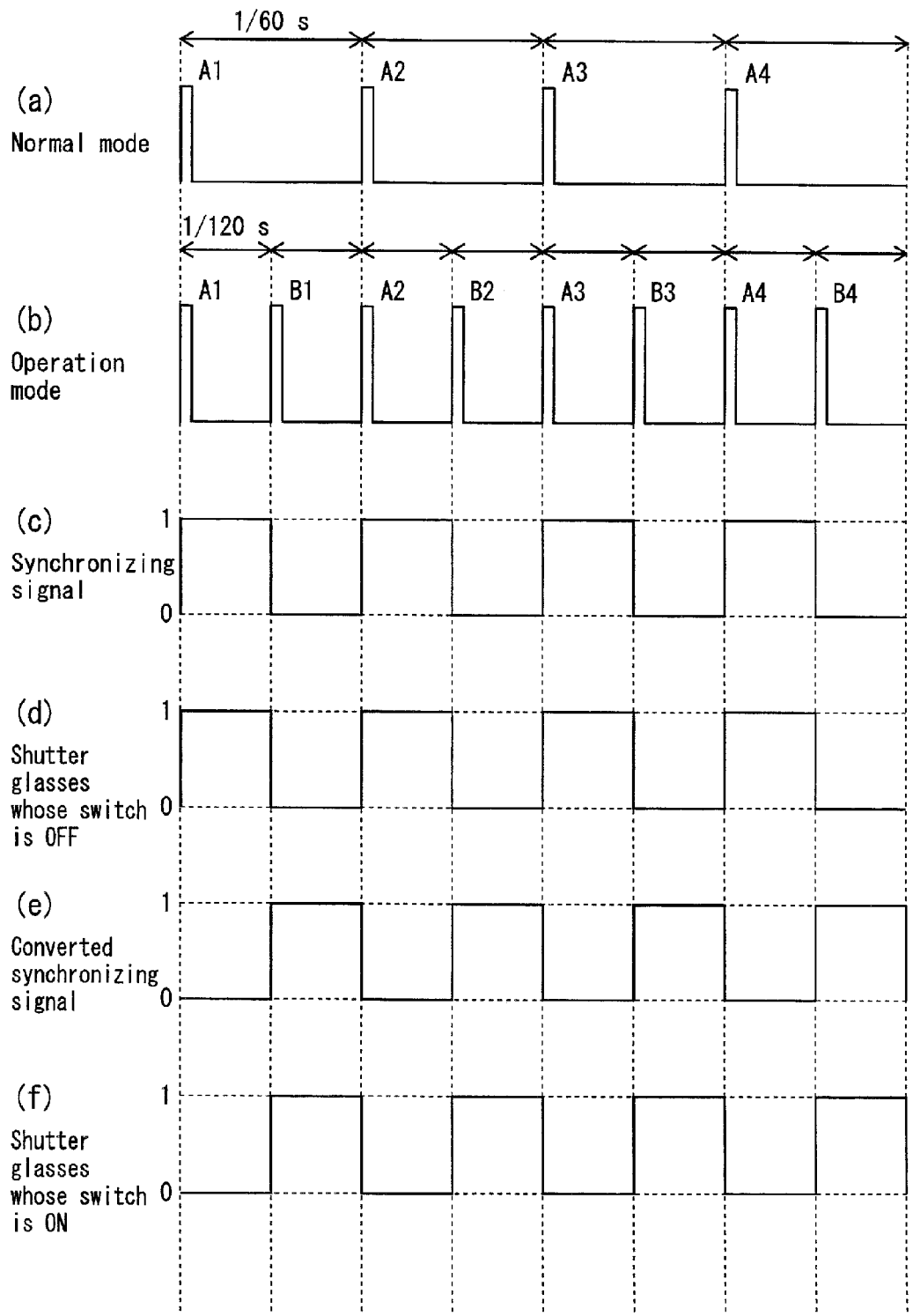
FIG. 9 shows shutter control performed by the shutter glasses with respect to a planar video relating to the embodiment.

FIG. 9 shows the relationship among timings of outputting images in the normal mode, timings of outputting images in the normal mode, synchronizing signals, and timings of performing shutter control, in the case where both the normal screen and the menu screen are each a planar video.

Since shutter control is unnecessary in the normal mode in this case, no synchronizing signal is transmitted. As shown in FIG. 9(b), in the operation mode, every two images constituting the menu screen are output between timings of outputting images constituting the normal screen shown in FIG. 9(a), at a frame rate as twice as high as a frame rate in the normal mode. Here, a synchronizing signal is transmitted as shown in FIG. 9(c). The shutter glasses whose switch is OFF open and close the shutters in synchronization with this synchronizing signal as shown in FIG. 9(d). The shutter glasses whose switch is ON convert the synchronizing signal as shown in FIG. 9(e), and open and close the shutters in synchronization with the converted synchronizing signal as shown in FIG. 9(f).

(2) In the above embodiment, in the case where a signal for outputting the normal screen is output, no signal is output at a time when a signal for outputting the menu screen is to be output in the operation mode. However, the present invention is not limited to this.

Figure 10:
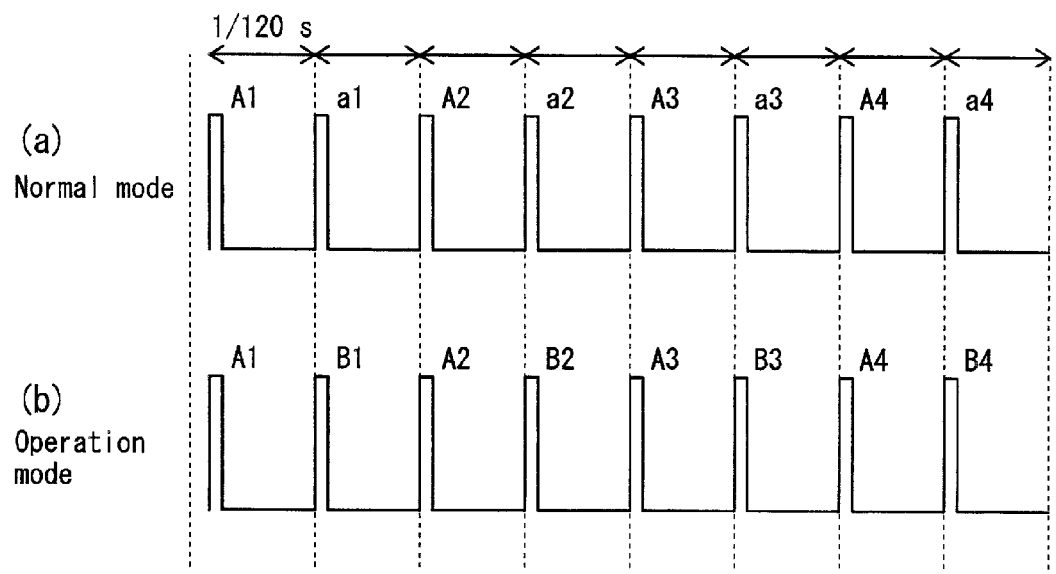
FIG. 10 shows an example where complementary images are output by the video output device relating to the embodiment.

FIG. 10 shows an example where when both the normal screen and the menu screen are each a planar video, complementary images a1 to a4 are output in the normal mode. A complementary image is for example generated, via computation processing, based on two images output before and after output of the complementary image, as an image to be displayed in the middle between the two images to be output. The complementary image a1 is generated based on images A1 and A2, for example. In the operation mode, images B1 to B4 constituting the menu screen are output instead of outputting the complementary images a1 to a4, and a synchronizing signal is transmitted such that judgment is made as to whether it comes to a timing of outputting the normal screen or a timing of outputting the menu screen. Upon receiving the synchronizing signal, the shutter glasses whose switch is OFF control the shutters to open at a timing of outputting the normal screen and close at a timing of outputting the menu screen. The shutter glasses whose switch is ON control the shutters to close at a timing of outputting the normal screen and open at a timing of outputting the menu screen. As a result, a video whose fluidity is increased more is output in the normal mode, and dual screen display of the normal screen and the menu screen are performed in the operation mode.

(3) In the above embodiment, a signal for outputting the menu screen is output at a time when no signal, which is between timings for outputting the normal screen. However, the present invention is not limited to this.

Figure 11:
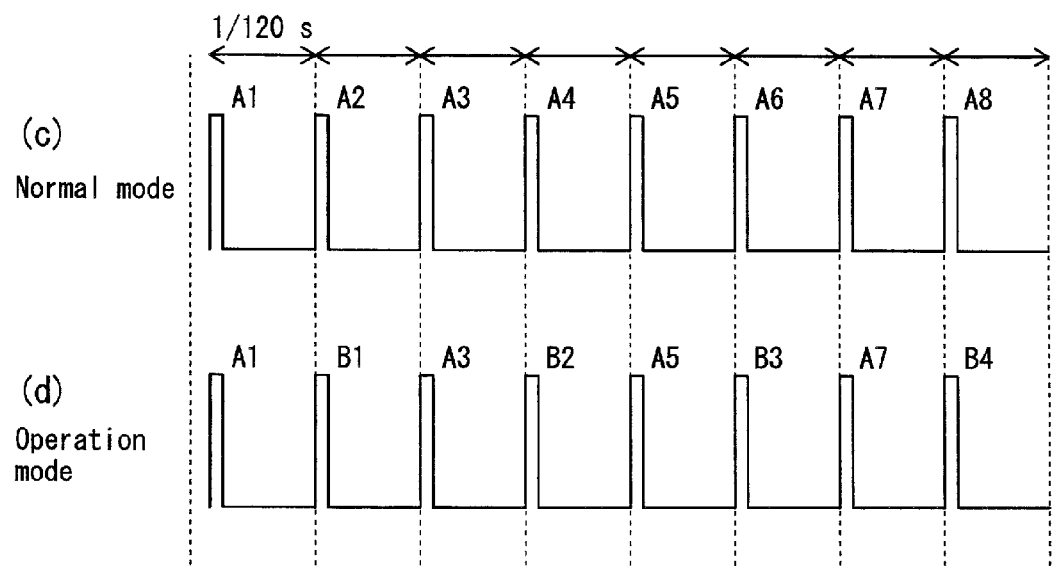
FIG. 11 shows an example where images are thinned for output by the video output device relating to the embodiment.

FIG. 11 shows an example where both the normal screen and the menu screen are each a planar video, and a video in the normal mode has a frame rate of 120 fps. In the operation mode, images B1 to B4 constituting the menu screen are output instead of outputting images A2, A4, A6, and A8, respectively, and a synchronizing signal is transmitted such that judgment is made as to judge whether it comes to a timing of outputting the normal screen or a timing of outputting the menu screen. Upon receiving the synchronizing signal, the shutter glasses whose switch is OFF control the shutters to open at a timing of outputting the normal screen and close at a timing of outputting the menu screen. The shutter glasses whose switch is ON control the shutters to close at a timing of outputting the normal screen and open at a timing of outputting the menu screen.

As a result, output of a fluid video is maintained in the normal mode. Only in the operation mode, dual screen display of the normal screen and the menu screen is performed in exchange for deterioration of the image quality due to lowering of the frame rate from 120 fps to 60 fps.

(4) In the above embodiment, the viewer who is operating the remote control 120 manually changes the switch of the selection unit 133 of his shutter glasses 130 so as to view the menu screen in the operation mode. However, the present invention is not limited to this.

Alternatively, human body communication may be employed for signal transmission between the remote control 120 and the shutter glasses 130, for example. Specifically, when the viewer who is operating the remote control 120 touches the remote control 120, the selection unit 133 of the shutter glasses 130 selects viewing of the menu screen.

Here, the human body communication is a technology of performing communication by applying an electrical current through human body. A terminal is provided in each of a part of the remote control 120 and a part of the shutter glasses 130, which are likely to get in contact with a skin of human body. When a viewer wearing the shutter glasses 130 touches the remote control 120, it is possible to detect contact between the remote control 120 and a skin of the viewer.

This allows only a viewer who needs to view the menu screen, that is, only a viewer who is to operate the remote control with his hand, to view the menu screen without any effort of manual change.

(5) In the above embodiment, images constituting the normal screen and images constituting the menu screen are output alternately one by one. However, the present invention is not limited to this.

Alternatively, the following may be employed, for example. Planar videos are used for convenience of description. The images A1 to A4 constituting the normal screen and the images B1 and B2 constituting the menu screen are output alternately between two images constituting the normal screen and one image constituting the menu screen, such as in this order of A1, A2, B1, A3, A4, and B2. In this case, a synchronizing signal is transmitted such that judgment is made as to whether it comes to a timing of outputting each of the images A1, B1, A3, and B2, that is, such that judgment is made as to when the type of image to be output is changed. This allows the shutter glasses to perform shutter control so as to select viewing of the normal screen or viewing of the menu screen. The synchronizing signal is only needs to be a signal indicating a timing switching between image sets, which are each composed of successive images that constitute the same video stream and have successive timings, such as the images A1 and A2.

(6) In the above embodiment, a video as a menu screen is composed of a normal video on which a graphics to be displayed as a menu is overlaid. However, the present invention is not limited to this.

Figure 12:
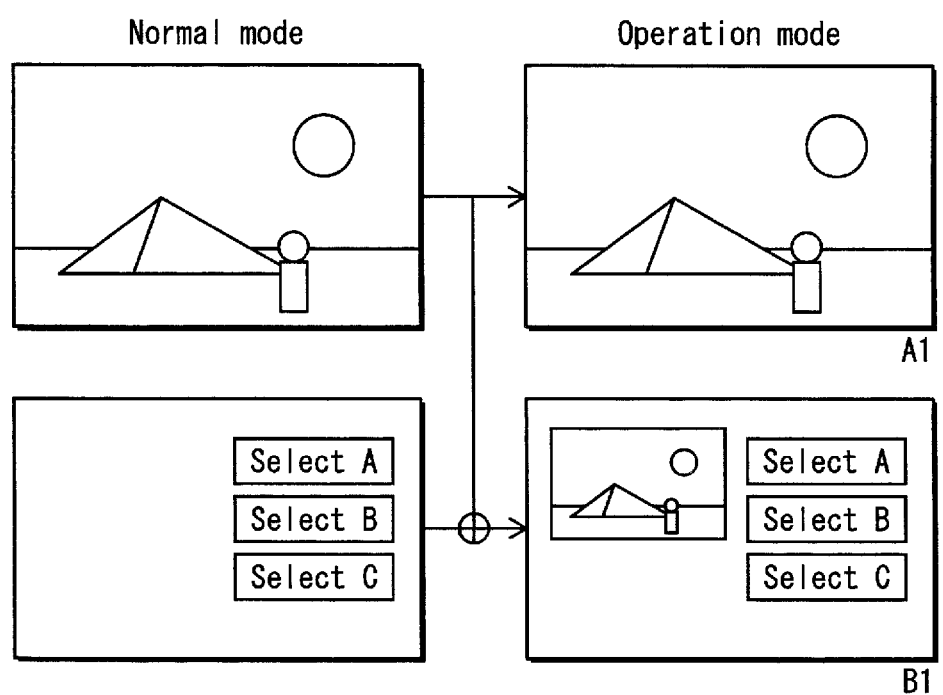
FIG. 12 shows an example of a menu screen that is composed of a reduced-size normal screen on a menu with no overlay relating to the video output device relating to the embodiment.

Alternatively, as such a menu screen, a screen composed of a normal screen whose size is reduced on a graphics to be displayed as a menu may be displayed with no overlay, such as shown at the lower right in FIG. 12.

Further alternatively, as such a menu screen, only a graphics to be displayed as a menu may be displayed without displaying the normal screen.

(7) In the above embodiment, as a screen that is temporarily displayed as a result of switching from the normal screen, the menu screen for changing the video and audio settings is displayed. However, the present invention is not limited to this.

Alternatively, as such a temporarily displayed screen, it may be possible to display a screen composed of a normal video on which information that is temporarily necessary in accordance with user operations is overlaid.

(8) In the above embodiment, the description has been given of the video output device as the present invention. The present invention further includes an integrated circuit having the same functions as the video output device or a control program for causing a computer to perform the same control as the video output device.

(9) In the above embodiment, a graphics is generated only in the operation mode. However, the present invention is not limited to this. Alternatively, a graphics may be generated irrespective of the current display mode. In this case, the generated graphics is composited with a video for display in the operation mode.

Also, in the above embodiment, a graphics is generated for each frame to be displayed. The present invention is not limited to this. Alternatively, the video output device may display a graphics, which has been generated and held therein, by compositing with a video, until a graphics to be displayed is switched from the graphics that is being displayed to another graphics.

(10) In the above embodiment, the images are output in the operation mode such as in this order of the images A1L, B1L, A1R, B1R, . . . . However, the present invention is not limited to this. Alternatively, the images may be output in this order of the images A1L, A1R, B1L, B1R, . . . , for example. In other words, the output order of the images may be any one as long as these four types of images are periodically output as one group.

The video output device relating to the present invention is useful as a video output device that allows each of a plurality of viewers to view a different video in a single display device by dynamically switching between the different videos.

REFERENCE SIGNS LIST

100: video output device
101: operation signal reception unit
102: display control unit
103: synchronization control unit
104: synchronizing signal transmission unit
105: video decoder
106: video frame buffer
107: graphics generation unit
108: graphics frame buffer
109: video output unit
110: TV
111: tuner
112: recording medium
113: display
120: remote control
121: operation unit
122: operation signal transmission unit
130: shutter glasses
131: synchronizing signal reception unit
132: synchronizing signal conversion unit
133: selection unit
134: shutter control unit

The invention claimed is:

1. A video output device that performs time-sharing output of a plurality of video streams, the video output device comprising:

an operation signal reception unit operable to receive operation signals each instructing to start or terminate a predetermined operation;

a video output unit operable,
  (i) in an operation mode, to alternately output first image sets each composed of two or more of first images constituting a first video stream and second image sets each composed of two or more images constituting a second video stream, the operation mode starting with reception of an operation signal instructing to start the predetermined operation and ending with reception of an operation signal instructing to terminate the predetermined operation, and
  (ii) in a normal mode that is other than the operation mode, to output images each generated based on any of the first images, without outputting the second images; and
a synchronizing signal transmission unit operable, in the operation mode, to transmit a synchronizing signal indicating a timing of switching output intervals between the first image sets and the second image sets, wherein
the first image sets are each composed of a first image and a second image that are for stereoscopic display, and the second image sets are each composed of a third image and a fourth image that are for stereoscopic display,
the video output unit outputs the first image, the third image, the second image, and the fourth image in a stated order,
in accordance with an image output by the video output unit, the synchronizing signal has one of a first value, a second value, and a third value, the first value instructing to close a first shutter of shutter glasses, the second value instructing to close the first shutter and a second shutter of the shutter glasses, and the third value instructing to close the second shutter of the shutter glasses,
the synchronizing signal transmission unit transmits the synchronizing signal to the shutter glasses such that a stereoscopic video composed of the first image sets is viewable, and
when a stereoscopic video composed of the second image sets is viewed, the synchronizing signal received by the shutter glasses is delayed by the output interval.

2. The video output device of claim 1, wherein
the second images are each generated by overlaying, on one of the first images that is output immediately before the second image is to be output, an image that is not included in the first images.

3. The video output device of claim 2, wherein
the images output in the normal mode include complementary images that are each generated based on any of the first images, and
at a time when each of the complementary images is output in the normal mode, a different one of the second images is output in the operation mode.

4. The video output device of claim 2, wherein
at a time when each of the second images is output in the operation mode, a different predetermined one of the first images is output in the normal mode.

5. The video output device of claim 1, wherein
the second images are each generated by overlaying, on an image that is other than one of the first images that is output immediately before the second image is to be output, the output first image whose size is reduced.

6. A video display system that includes a video display device that performs time-sharing display of a plurality of video streams and shutter glasses for use in viewing a video displayed by the video display device, the video display device comprising:

an operation signal reception unit operable to receive operation signals each instructing to start or terminate a predetermined operation;
a video output unit operable,
  (i) in an operation mode, to alternately output first image sets each composed of two or more images constituting a first video stream and second image sets each composed of two or more of second images constituting a second video stream, the operation mode starting with reception of an operation signal instructing to start the predetermined operation and ending with reception of an operation signal instructing to terminate the predetermined operation, and
  (ii) in a normal mode that is other than the operation mode, to output images each generated based on any of the first images, without outputting the second images; and
a synchronizing signal transmission unit operable, in the operation mode, to transmit a synchronizing signal indicating a timing of switching output intervals between the first image sets and the second image sets; and
a video display unit operable to display the video output by the video output unit, and
the shutter glasses comprising:
a selection unit operable to select viewing of the first video stream or viewing of the second video stream in the operation mode;
a synchronizing signal reception unit operable to receive the synchronizing signal; and
a shutter control unit operable to perform shutter control of shutters of the shutter glasses in the operation mode based on the synchronizing signal, such that (i) when viewing of the first video stream is selected, at least one of the shutters is opened in an output interval of the first image set and the shutters are closed in an output interval of the second image set, and (ii) when viewing of the second video stream is selected, all the shutters are closed in the output interval of the first image set and at least one of the shutters is opened in the output interval of the second image set, wherein
the first image sets are each composed of a first image and a second image that are for stereoscopic display, and the second image sets are each composed of a third image and a fourth image that are for stereoscopic display,
the video output unit outputs the first image, the third image, the second image, and the fourth image in a stated order,
in accordance with an image output by the video output unit, the synchronizing signal has one of a first value, a second value, and a third value, the first value instructing to close a first shutter of the shutter glasses, the second value instructing to close the first shutter and a second shutter of the shutter glasses, and the third value instructing to close the second shutter of the shutter glasses,
the synchronizing signal transmission unit transmits the synchronizing signal to the shutter glasses such that a stereoscopic video composed of the first image sets is viewable,
the shutter glasses further comprises
a signal conversion unit operable, when viewing of the second video stream is selected, to convert the synchronizing signal received by the synchronizing signal reception unit to a signal delayed by the output interval, and
when viewing of the second video stream is selected, the shutter control unit performs the shutter control based on the signal converted by the signal conversion unit.

7. The video display system of claim 6, wherein the shutter glasses include
- a detection unit operable to detect whether a viewer wearing the shutter glasses is holding an operation device for instructing to start and terminate the predetermined operation, and
- when the detection unit detects that the viewer is holding the operation device, the selection unit selects viewing of the second video stream, and
- when the detection unit detects that the viewer is not holding the operation device, the selection unit selects viewing of the first video stream.

* * * * *